US010306492B2

(12) United States Patent
Griesing et al.

(10) Patent No.: US 10,306,492 B2
(45) Date of Patent: May 28, 2019

(54) SMALL CELL INTERFERENCE EMULATOR

(71) Applicant: Azimuth Systems, Inc., Acton, MA (US)

(72) Inventors: John Robert Griesing, Sudbury, MA (US); Charles R. Wright, Winchester, MA (US)

(73) Assignee: Azimuth Systems, Inc., Acton, MA (US)

( * ) Notice: Subject to any disclaimer, the term of this patent is extended or adjusted under 35 U.S.C. 154(b) by 1136 days.

(21) Appl. No.: 14/327,318

(22) Filed: Jul. 9, 2014

(65) Prior Publication Data

US 2015/0016290 A1 Jan. 15, 2015

Related U.S. Application Data

(60) Provisional application No. 61/844,066, filed on Jul. 9, 2013.

(51) Int. Cl.
*H04W 24/06* (2009.01)
*H04W 16/22* (2009.01)

(52) U.S. Cl.
CPC .......... *H04W 24/06* (2013.01); *H04W 16/22* (2013.01)

(58) Field of Classification Search
CPC ............................. H04W 24/06; H04W 16/22
USPC ....................................................... 370/252
See application file for complete search history.

(56) References Cited

U.S. PATENT DOCUMENTS

2012/0003982 A1* 1/2012 Natarajan ............. H04W 24/06
455/450
2013/0315092 A1* 11/2013 Yu ..................... H04W 52/0216
370/252

* cited by examiner

*Primary Examiner* — Chi Tang P Cheng
(74) *Attorney, Agent, or Firm* — Anderson Gorecki LLP (57) ABSTRACT

A heterogeneous network scenario is simulated using a combination of real cells, real user devices, and a multi-cell network emulator which provides emulated cells, emulated real devices, and channel emulation. The multi-cell network emulator may utilize playback files and signals from the real cells and real user devices to generate emulated cell signals and emulated real device signals. Further, a single real signal can be utilized to generate multiple emulated signals.

60 Claims, 8 Drawing Sheets

SMALL CELL INTERFERENCE EMULATOR

CROSS-REFERENCE TO RELATED APPLICATIONS

This application claims the benefit of U.S. Provisional Patent Application No. 61/844,066 filed Jul. 9, 2013, titled Small Cell Interference Emulator, which is incorporated by reference.

BACKGROUND

The subject matter of this disclosure is generally related to testing of wireless devices. A wide variety of wireless devices exist. Examples include but are not limited to mobile phones, base stations, wireless routers, cordless phones, personal digital assistants (PDAs), desktop computers, tablet computers, and laptop computers. Testing of a wireless device may be desirable for any of various reasons. For example, testing can be done in the development stage in order to determine whether a prototype wireless device functions as predicted. Testing may also be useful for determining whether production wireless devices perform within specifications. Testing is also performed to predict device performance and user experience, e.g. testing in a lab to predict what will happen in a real world situation.

Current generation cellular technology is referred to as 4G or LTE (Long Term Evolution). Extensions to the LTE specifications, commonly referred to as LTE-A, or LTE Advanced, are underway. LTE networks are designed to provide higher throughput to the user device and overall system relative to earlier technologies. MIMO (Multiple Input, Multiple Output) technology, for example, is one aspect of providing higher throughput in an LTE network. Another aspect is increasing the likelihood that the user device will be close to a cell site. It is understood that decreasing the distance between the user device and the base station cell site corresponds to improved signal to noise ratio, which enables the use of higher modulations that deliver more bits per hertz resulting in overall higher throughput as well as a more robust connection. One way to increase the likelihood that the user device will be close to a cell site is to deploy more cells, i.e., increase cell density. Increasing the density of traditional macro cells may be impractical due to the equipment expense and lack of suitable locations for deployment. However, small cells which are often deployed to reduce congestion and loading of a macro cell may be used to increase cell density. Small cells are similar to macro cells in that they function as a cellular base station via which user devices can attach to the network, but they differ from macro cells in other ways. For example, small cells tend to be less costly and physically smaller than macro cells. Also, small cells typically transmit at lower power levels than macro cells, e.g., from several watts to milli-watts of power. Consequently, small cells typically have a smaller operating range than macro cells. Further, the deployment of small cells is relatively simple and adaptable in comparison with macro cells, e.g., rather than being mounted on a tower small cells may be mounted on lamp posts, ceilings, or even placed on a table in a residential building, for example and without limitation. Small cells can be open to all users or they may be open to only a select group of users, e.g., a CSG (Closed Subscriber Group). A mix of macro and small cells operating on the same frequency is referred to as a "heterogeneous network."

The planned proliferation of small cells and heterogeneous networks creates unique challenges for network operators and device manufacturers in terms of device performance and user experience. Within a given region such as that serviced by a macro cell, small cells are sometimes deployed where the population or density of users creates a need to mitigate loading on the macro cell and thus alleviate congestion. Examples include but are not limited to metro areas where people gather, other areas of high user concentration (airports, stadiums, etc.), in company or university campuses, and residential areas such as apartment buildings. Consequently, small cells may be deployed in clusters rather than evenly distributed within the region. Small cells may also be deployed in an uncoordinated and unplanned manner by end users and others, in addition to being deployed in a coordinated and planned manner by a network operator. Consequently, a wide variety of small cell deployments and heterogeneous network scenarios may be encountered in the real world. Network operators and device manufacturers have a need for the ability to perform tests in such cell deployments and heterogeneous network scenarios.

SUMMARY

All examples and features mentioned below can be combined in any technically possible way.

In accordance with an aspect, an apparatus for testing the performance of a wireless device in a multi cell network environment, where interference from the cells is of interest in the performance evaluation, comprises: a multi cell network emulator with the ability to emulate both the dynamic fading channel conditions as well as the specific dynamic interference conditions of the environment for a user device attached to the multi cell network emulator. In some implementations, the dynamic interference can be for the cell device, or both the user and cell devices attached to the multi cell network emulator. In some implementations, a real macro cell and a real small cell will be attached to the multi cell network emulator along with a real user device, and the remaining cells in the network environment will be emulated by the multi cell network emulator. A network environment can be described by the density of the cells, spacing, power, etc. In some implementations, the multi cell network emulator comprises a channel emulator which operates on the signals from the real macro or small cell devices, to cause these signals to exhibit channel conditions which vary over time; and the user device being attached to the multi cell network emulator to receive such signals along with reception of emulated cell signals. In some implementations the multi cell network emulator contains technology specific signal receivers to demodulate and decode the signals of the real devices attached to the multi cell network emulator. In some implementations the emulated cell signals are explicitly synchronized to the other cells in the network to provide signal emulation that is coordinated with the real cells. In some implementations, the number of emulated cells may vary over time to represent changing mobility and coverage of the user device. In some implementations, the properties of the emulated cells signals, such as but not limited to signal bandwidth, transmission mode, and specific signal content may vary with time to represent the changing mobility and channel conditions at the user device and provide very specific conditions for the interference mitigation techniques. In some implementations the specific technology signals representing emulated cells are further emulated to provide channel effects that represent the mobility parameters, such as velocity, fast fading, delay, power, multipath, etc. In some implementations, the additional user devices can also be emulated such that the interference and loading of such may be directed to the real base station cell. In some implementations, both cell emulation and user device emulation may exist. In some implementations the specific parameters of interference power may be set real time or played back from some file. In some implementation, the parameters of the emulated cell are set to look like a group of cells, as opposed to an individual cell to represent statistical coverage areas such as a densely populated residential dwelling with many small cells. In some implementations, the actual recording of cells in a real network deployment can be used as the emulated cells.

In accordance with another aspect an apparatus comprises: a multi-cell network emulator comprising: a first interface configured to communicate with a first real cell device which generates a first real cell signal; a second interface configured to communicate with a real user device; at least one cell emulator configured to generate a plurality of emulated cell signals; and a connection matrix configured to provide bi-directional communication between the first interface and the second interface, and to provide communication between the second interface and the cell emulator such that the real user device receives the emulated cell signals. In some implementations the apparatus further includes at least one channel emulator configured to modify signals communicated between the real cell device and the real user device in accordance with a first set of defined channel conditions. In some implementations the cell emulator utilizes the first real cell signal to generate the emulated cell signals. In some implementations the cell emulator obtains information related to broadcast and scheduling of the first real cell signal. In some implementations the obtained information related to broadcast and scheduling includes one or more of: normal subframe ABS pattern and MBSFN (Multimedia Broadcast Single Frequency Network) subframe ABS pattern. In some implementations the cell emulator obtains specific timing information from first real cell signal. In some implementations the obtained specific timing information includes one or more of: LTE PSS (Long Term Evolution Primary Synchronization Signal), SSS (Secondary Synchronization Signal), PBCH (Physical Broadcast Control Channel), SFN (System Frame Number) and the SOF (Start of Frame). In some implementations the cell emulator comprises a signal generator which generates a technology specific signal based on the obtained information related to broadcast and scheduling of the first real cell signal. In some implementations the cell emulator includes a signal generator configured to generate signals based on a statistical model, a playback of a specific field recording, or a combination of multiple signals merged to one signal. In some implementations the cell emulator further comprises a synchronizer which synchronizes the technology specific signal to the first real cell signal based on the obtained timing information. In some implementations the cell emulator further comprises a channel emulation module which modifies the synchronized technology specific signal in accordance with defined channel conditions to provide a first intermediate signal. In some implementations the cell emulator further comprises a gain module which adjusts a power level of the first intermediate signal in accordance with a defined mobility path of the real user device to generate a second intermediate signal. In some implementations the cell emulator further comprises a frequency module which positions one of the emulated cell signals in a defined frequency domain. In some implementations a third interface is configured to communicate with a second real cell device which generates a second real cell signal, and the connection matrix is configured to provide bi-directional communication between the third interface and the second interface. In some implementations the first real cell device is a macro cell device and the second real cell device is a small cell device. In some implementations the cell emulator utilizes at least one playback file to generate the emulated cell signals. In some implementations the playback file is based on user-defined data, field log data, or model data. In some implementations a plurality of additional interfaces are configured to communicate with real devices and connect those real device to the connection matrix, the real devices selected from a group including real cell devices and user devices. In some implementations at least one emulator is configured to generate a plurality of emulated user device signals.

In accordance with another aspect a method comprises: with a multi-cell network emulator comprising a first interface configured to communicate with a first real cell device which generates a first real cell signal, a second interface configured to communicate with a real user device, at least one cell emulator, and a connection matrix: generating a plurality of emulated cell signals; providing bi-directional communication between the first interface and the second interface; and providing communication between the second interface and the cell emulator such that the real user device receives the emulated cell signals. In some implementations the method further includes modifying signals communicated between the real cell device and the real user device in accordance with a first set of defined channel conditions. In some implementations the method further includes utilizing the first real cell signal to generate the emulated cell signals. In some implementations the method further includes obtaining information related to broadcast and scheduling of the first real cell signal. In some implementations the obtained information related to broadcast and scheduling includes one or more of: normal subframe ABS pattern and MBSFN (Multimedia Broadcast Single Frequency Network) subframe ABS pattern. In some implementations the method further includes obtaining specific timing information from first real cell signal. In some implementations the obtained specific timing information includes one or more of: LTE PSS (Long Term Evolution Primary Synchronization Signal), SSS (Secondary Synchronization Signal), PBCH (Physical Broadcast Control Channel), SFN (System Frame Number) and the SOF (Start of Frame). In some implementations the method further includes generating a technology specific signal based on the obtained information related to broadcast and scheduling of the first real cell signal. In some implementations the method further includes generating the emulated signals based on a statistical model, a playback of a specific field recording, or a combination of multiple signals merged to one signal. In some implementations the method further includes synchronizing the technology specific signal to the first real cell signal based on the obtained timing information. In some implementations the method further includes modifying the synchronized technology specific signal in accordance with defined channel conditions to provide a first intermediate signal. In some implementations the method further includes adjusting a power level of the first intermediate signal in accordance with a defined mobility path of the real user device to generate a second intermediate signal. In some implementations the method further includes positioning one of the emulated cell signals in a defined frequency domain. In some implementations a third interface is configured to communicate with a second real cell device which generates a second real cell signal, and providing bi-directional communication between the third interface and the second interface. In some implementations the first real cell device is a macro cell device and the second real cell device is a small cell device. In some implementations the method further includes utilizing at least one playback file to generate the emulated cell signals. In some implementations the method further includes generating the playback file based on user-defined data, field log data, or model data. In some implementations a plurality of additional interfaces are configured to communicate with real devices and connect those real device to the connection matrix, the real devices selected from a group including real cell devices and user devices. In some implementations the method further includes generating a plurality of emulated user device signals.

In accordance with another aspect computer program code is provided for use with a multi-cell network emulator device comprising a first interface configured to communicate with a first real cell device which generates a first real cell signal, a second interface configured to communicate with a real user device, at least one cell emulator, a connection matrix, and communication pathways which provide bi-directional communication between the first interface and the second interface, and communication between the second interface and the cell emulator, the computer program code stored in non-transitory memory and comprising instructions that generate a plurality of emulated cell signals such that the real user device receives the emulated cell signals. In some implementations the program code further includes instructions that modify signals communicated between the real cell device and the real user device in accordance with a first set of defined channel conditions. In some implementations the program code further includes instructions that utilize the first real cell signal to generate the emulated cell signals. In some implementations the program code further includes instructions that obtain information related to broadcast and scheduling of the first real cell signal. In some implementations the obtained information related to broadcast and scheduling includes one or more of: normal subframe ABS pattern and MBSFN (Multimedia Broadcast Single Frequency Network) subframe ABS pattern. In some implementations the program code further includes instructions that obtain specific timing information from first real cell signal. In some implementations the obtained specific timing information includes one or more of: LTE PSS (Long Term Evolution Primary Synchronization Signal), SSS (Secondary Synchronization Signal), PBCH (Physical Broadcast Control Channel), SFN (System Frame Number) and the SOF (Start of Frame). In some implementations the program code further includes instructions that generate a technology specific signal based on the obtained information related to broadcast and scheduling of the first real cell signal. In some implementations the program code further includes instructions that generate the emulated signals based on a statistical model, a playback of a specific field recording, or a combination of multiple signals merged to one signal. In some implementations the program code further includes instructions that synchronize the technology specific signal to the first real cell signal based on the obtained timing information. In some implementations the program code further includes instructions that modify the synchronized technology specific signal in accordance with defined channel conditions to provide a first intermediate signal. In some implementations the program code further includes instructions that adjust a power level of the first intermediate signal in accordance with a defined mobility path of the real user device to generate a second intermediate signal. In some implementations the program code further includes instructions that position one of the emulated cell signals in a defined frequency domain. In some implementations the multi-cell network emulator device further includes a third interface configured to communicate with a second real cell device which generates a second real cell signal, and the program code further includes instructions that provide bi-directional communication between the third interface and the second interface. In some implementations the first real cell device is a macro cell device and the second real cell device is a small cell device. In some implementations the program code further includes instructions that utilize at least one playback file to generate the emulated cell signals. In some implementations the program code further includes instructions that generate the playback file based on user-defined data, field log data, or model data. In some implementations a plurality of additional interfaces are configured to communicate with real devices and connect those real device to the connection matrix, the real devices selected from a group including real cell devices and user devices. In some implementations the program code further includes instructions that generate a plurality of emulated user device signals.

DETAILED DESCRIPTION

Some aspects may be implemented by one or more computer programs. Such computer programs are stored in non-transitory computer-readable memory and executed by physical processing hardware in physical apparatus to perform various tasks. Moreover, the features described below can be used in any of a wide variety of combinations that are not limited to the illustrated and described examples.

Figure 1:
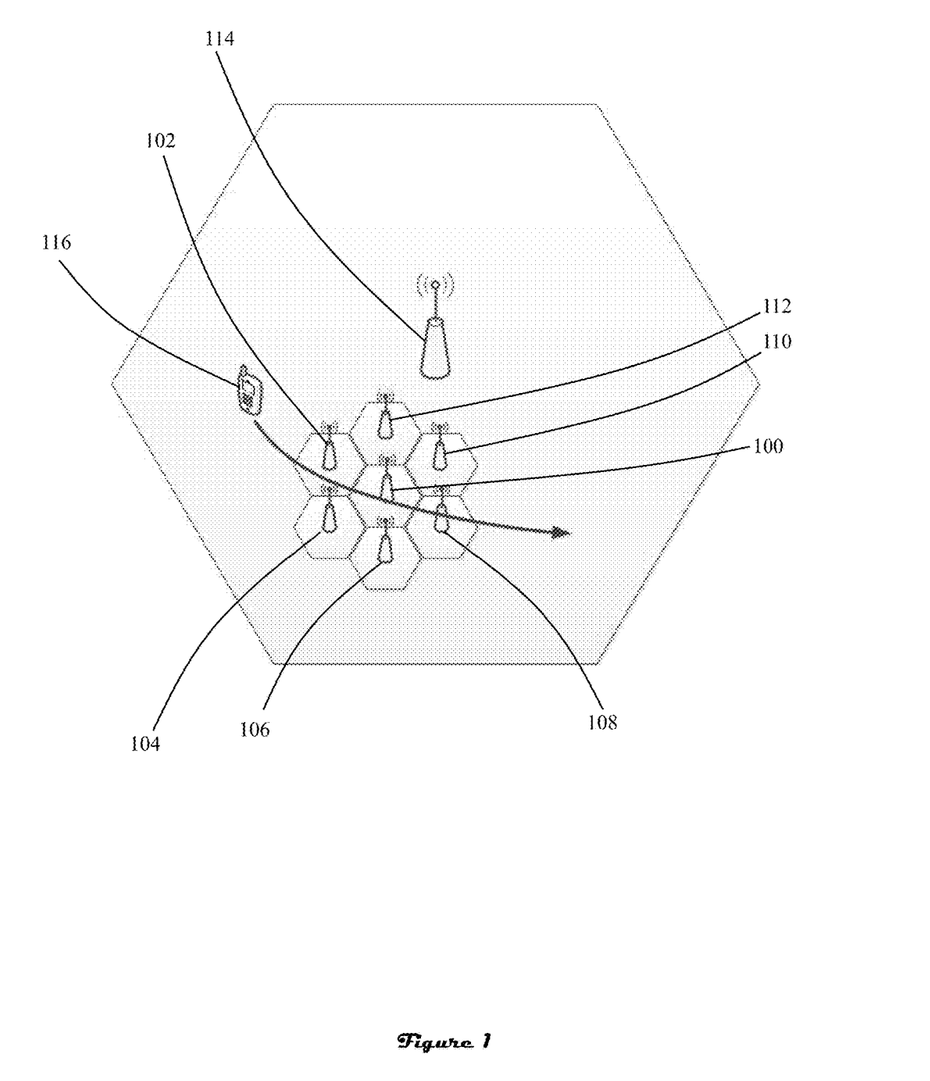
FIG. 1 illustrates a real multi-cell heterogeneous network.

FIG. 1 illustrates a real world heterogeneous network scenario in which multiple small cells 100, 102, 104, 106, 108, 110, 112 are deployed as an underlay network within the coverage range of a macro cell 114. A variety of different types of small cells are known, including but not limited to micro cells, pico cells, and femto cells. The different types of small cells are differentiated by various characterizing parameters. In this disclosure the term "small cell" is used to represent any type or class of base station cell other than the traditional macro base station cell. A mix of macro and small cells operating on the same frequency is referred to as a "heterogeneous network." The coverage range for each cell is represented as a hexagonal region centered on that cell. The illustrated coverage range represents a defined limit of adequate signal to noise ratio to properly receive the signal from that cell. However, as will be explained in greater detail below, signals from the cell devices may be present beyond the coverage range boundaries, possibly at levels that support attachment with user devices. A traditional macro cell may be characterized by a coverage range of up to 35 km. Micro cells may be characterized by a coverage range of 2 km or less. Pico cells may be characterized by a coverage range of 200 m or less. Femto cells may be characterized by a coverage range of about 10 m. The small cells in the illustrated scenario are deployed in a cluster, such as might occur where user density is predictably non-uniform within the coverage range of the macro cell. However, a wide variety of deployment scenarios could be simulated, including more complex scenarios with many more devices, including multiple user devices, and multiple clusters or evenly distributed small cells, for example and without limitation.

A test including a simulation of a real world action in the illustrated scenario will be used to provide context for this disclosure. In the illustrated example the real world action to be simulated is the wireless user device 116 traversing the cluster of small cells. Such an action is of interest because although the user device may experience relatively high signal power or high signal to noise ratio from the cell with which it is communicating while traversing the small cells, the other cells with which the user device is not attached (both other macro and small cells) produce interference to which the user device may be subjected. The power levels of this interference may be high because of proximate or overlapping coverage areas. Moreover, this interference is not random because it is associated with the same type of signals, e.g. the same protocol or technology such as LTE signals, from the other cells operating on the same frequency at the same time. In addition to coping with interference from other cells the user device may be presented with multiple attachment and de-attachment decisions. The decision of whether the user device will attach to any of the small cells is a function of many things, including but not limited to network loading, channel conditions, velocity of the user, the access control on the small cell and the Signal to Interference and Noise ratio (SINR). Consequently, the test may be indicative of both performance in the presence of interference and handover behavior in heterogeneous network scenarios.

Another aspect of testing in a simulated heterogeneous network is generating an indication of device performance when interference mitigation techniques are employed. Various techniques which may be implemented by base stations and wireless devices are being developed under the umbrella of inter-cell interference coordination (ICIC) to mitigate problems caused by interference in heterogeneous networks. Transmission of almost blank subframes (ABS) is one technique that can be used for mitigating problems caused by such interference. The macro cell schedules transmission of subframes that are void of data transmission except critical control channel information. These almost blank transmission periods create opportunities for transmissions by small cells to user devices that are most impacted by interference from macro cell transmissions. Other techniques that may be employed include cell biasing and cell range extension (CRE). If small cells are deployed to remove congestion from a macro cell, it is in the network operator's interest to keep users on the small cell for as long as possible. Cell biasing and cell range extension (CRE) extend the range of the small cell by changing the operating point at which the user device will attach or dis-attach from the small cell. In other words, cell biasing and CRE help keep user devices attached to small cells longer than they otherwise would be at the expense of degrading SINR. However, the use of ABS with CRE mitigates the impact of the degraded SINR. Other techniques of interference cancelation are also being developed. The development of new interference mitigation techniques, wireless devices and network infrastructure, coupled with the wide variety of possible operating scenarios in heterogeneous networks, creates a need for new test equipment features and capabilities. Open air testing in a real environment is generally impractical due to space requirements and uncontrollable ambient conditions. A lab-based test bed for simulating a heterogeneous network can be created using channel emulators. Channel emulators create (or recreate) channel conditions exhibited between real cell devices and real user devices connected to the test bed. For example, channel emulators can provide fading and additive white Gaussian noise (AWGN). However, AWGN cannot be used to accurately model the interference created by LTE-A heterogeneous networks or any type of network communication signal because of the specific characteristics of the heterogeneous network interference, e.g., transmissions using the same protocol and frequency. A heterogeneous network could be simulated using many real small cells and real macro cells interconnected via a test bed, but such a test bed would be impractical in terms of cost, time, operational complexity, and space because of the relatively large number of real small cells that would need to be connected to the user device simultaneously to simulate anything other than a simple heterogeneous network. Moreover, a large number of channel emulators would be required to provide the necessary channel characteristics between the large number of devices connected to the test bed because channel conditions including but not limited to power, fading and Doppler would need to be controlled for each path of the cell to the user device. The cells would also need to be synchronized using some backend/not-RF means to insure that they function in a coordinated way. A limited test bed with a small number of real devices (macro cell, small cell and user device) and a signal generator that mimics other devices could be more practical to implement. However, synchronization of the signal generator with the real cells is problematic because signal generators do not receive, demodulate and act upon cellular signals. Additionally, signal generators must be cabled into the test bed, and the cabling introduces errors and uncertainties which requiring precisely calibrated mechanisms to insure the tolerances required to test the proper SINR. Consequently, current lab-based simulators are not practical for simulating some or most heterogeneous network scenarios that may be encountered in the real world.

Figure 2:
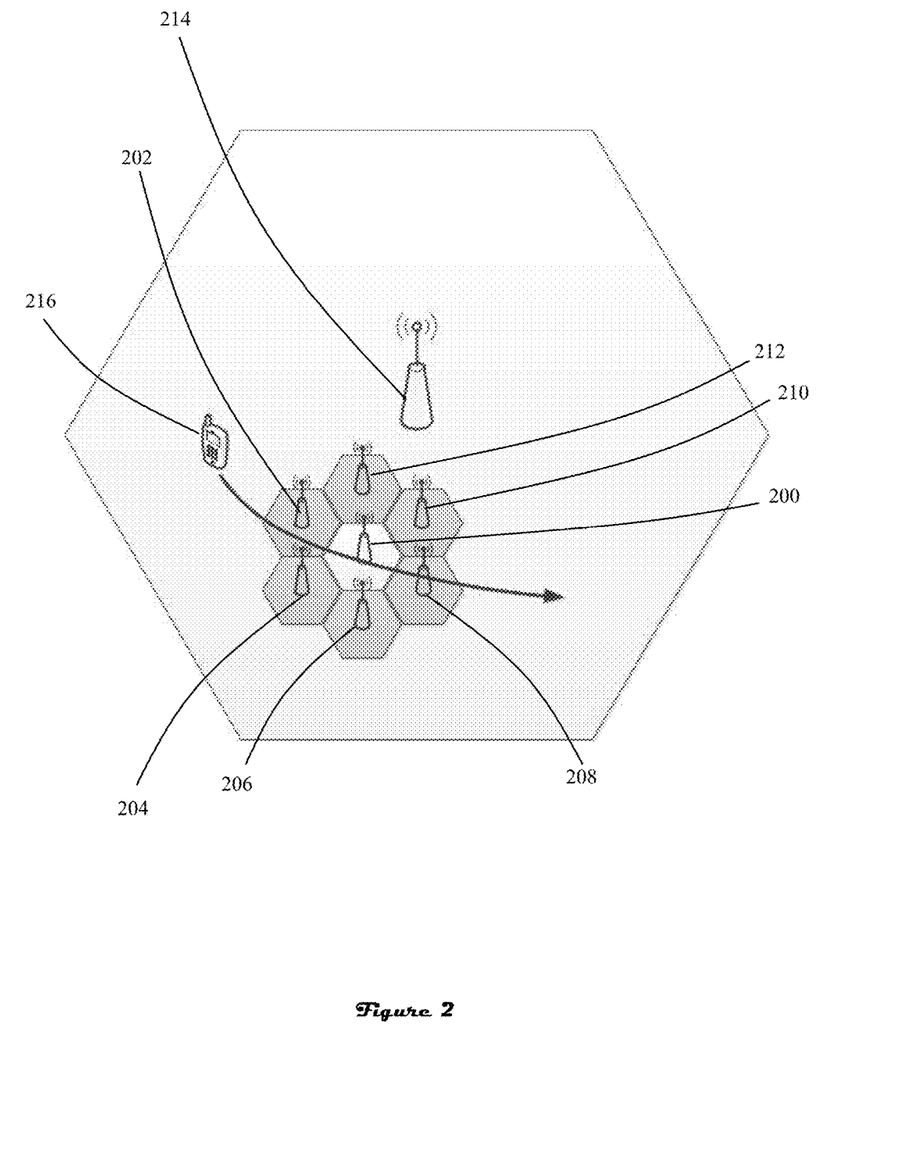
FIG. 2 illustrates a simulation of the real network FIG. 1.

FIG. 2 represents a simulation of the real network scenario of FIG. 1. In the simulation some devices are emulated and some devices are real. Any type of device may be emulated, and in any numbers. For example, an arbitrary number of cell devices and user devices may be emulated. In the specifically illustrated example a real macro cell 214 is used to provide functions of macro cell 114 (FIG. 1), a real small cell device 200 is used to provide functions of small cell 100 (FIG. 1), and a real user device 216 is used to provide the functions of user device 116 (FIG. 1). Small cell device emulators 202, 204, 206, 208, 210, 212 are used to simulate real small cell devices 102, 104, 106, 108, 110, 112 (FIG. 1). The use of small cell device emulators in place of real devices helps to reduce cost and complexity. Although the emulated cells are shown as small cells, any class of cell can be emulated, including but not limited to macro, micro, femto and pico, and various combinations thereof. The relative locations and ranges of the cells correspond to the real world scenario of FIG. 1, and as previously indicated the ranges may be overlapping.

Figure 3:
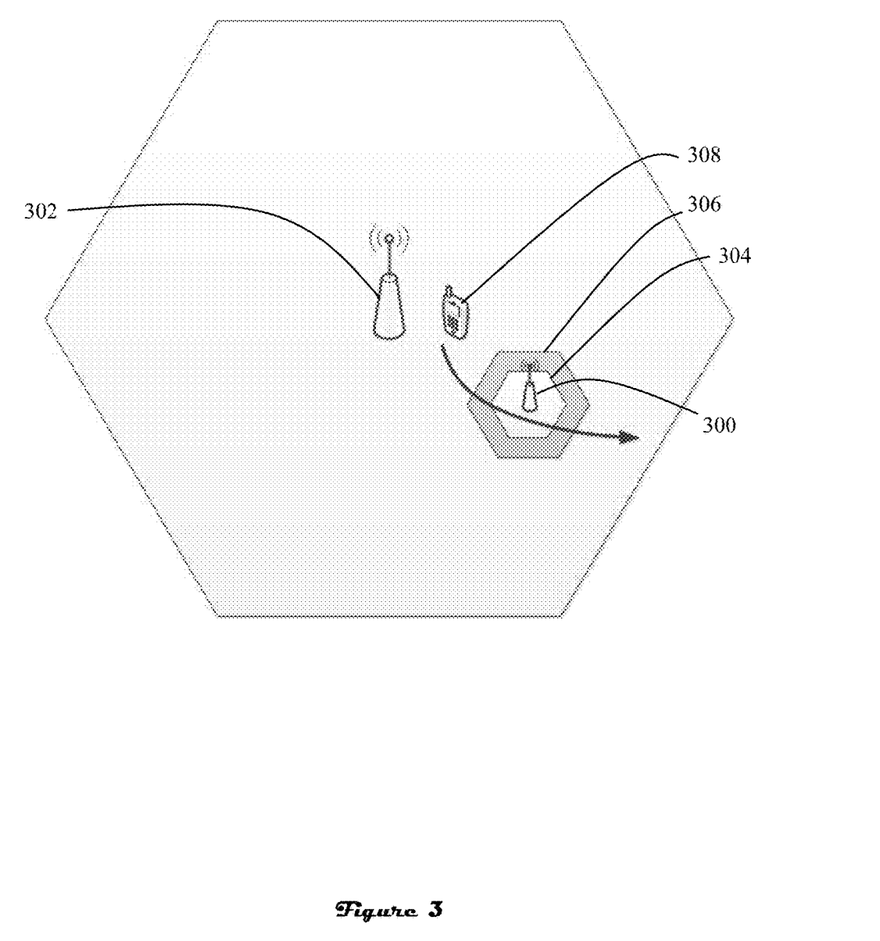
FIG. 3 illustrates a defined mobility path of a user device under test relative to macro and small cell coverage areas.

FIG. 3 illustrates aspects of cell range, cell biasing, CRE and mobility path in greater detail. For simplicity a single small cell 300 network is shown as an underlay to a single macro cell 302 network. The coverage range of the small cell is represented by an inner hexagon 304 and an outer hexagon 306. The inner hexagon 304 defines the area in which the SINR between the user device 308 and the small cell 300 is greater than the SINR between the user device and the macro cell 302. The area outside the outer hexagon 306 but within the range of the macro cell 302 is where the SINR between the user device and the small cell is less than the SINR between the user device and the macro cell and communication between the user device and the small cell is impractical. The transitional area between the inner hexagon 304 and outer hexagon 306 boundaries is the area where the user device 308 may experience approximately equal or lower SINR from the small cell as compared to the SINR experienced between the user device from the macro cell, and communication with the small cell is practical. For example, the SINR from the small cell may be less than the SINR from the macro cell but attachment to the small cell is possible. In some types of networks a user device would hand over from the small cell to the macro cell in the transitional area, e.g., when the SINR from the macro cell becomes greater than the SINR from the small cell. However, in a LTE-A heterogeneous network that is operating with cell biasing or CRE the user device is not allowed to handover to the macro cell in this region. Rather, the user device 308 is instructed to stay attached to the small cell 300. Further, transmissions from the small cell to the user device may be scheduled in ABS of the macro cell 302. These conditions may be included in the simulation.

Figure 4:
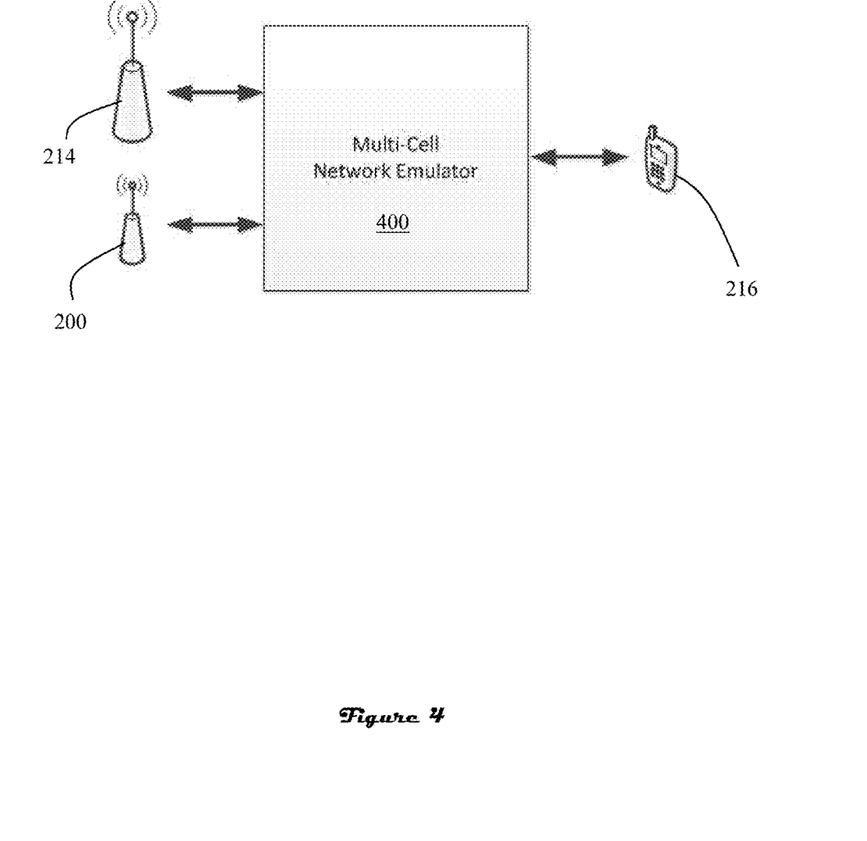
FIG. 4 is a logical block diagram of a multi-cell network emulator.

FIG. 4 illustrates a physical test bed corresponding to the simulation of FIG. 2. The emulated cells 202, 204, 206, 208, 210, 212 (FIG. 2) are implemented by a multi-cell network emulator 400. The real macro cell 214, real small cell device 200, real user device 216 are connected to the multi-cell network emulator. The real devices may be mounted in test chambers which permit over-the-air transmission, or mounted in EMI-shielded containers with direct cabling to the multi-cell network emulator, e.g., with wired connections which bypass antennas. The multi-cell network emulator 400 may include specialized and general purpose hardware components and processors as well as non-transitory computer-readable memory, software, and various other components and resources utilized in the electronics arts. The multi-cell network emulator emulates cell devices and provides the channel conditions which allow the test to be performed, e.g., modifying channel conditions in order to simulate the movement of the user device relative to the real and emulated cells. The two real cells and real user device shown connected to the multi-cell network emulator correspond to the specific example of FIG. 2. However, any number of cell devices and user devices and connections could be utilized and implemented with the duplication of more of the internal blocks.

Figure 5:
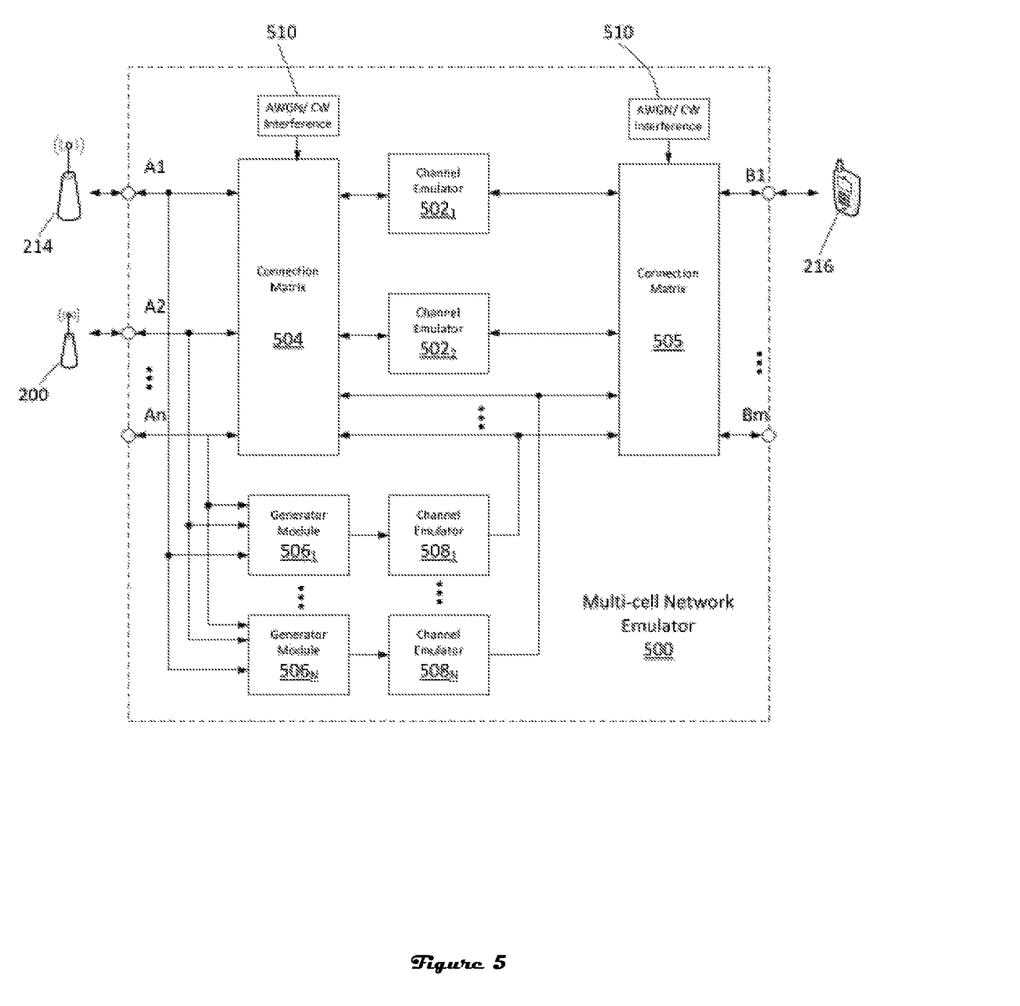
FIG. 5 is a detailed block diagram of one implementation of the multi-cell network emulator of FIG. 4.

FIG. 5 is a detailed block diagram of one implementation of the multi-cell network emulator of FIG. 4. The illustrated multi-cell network emulator 500 includes ports A1-An and B1-Bm. Connection matrix 504 is connected to ports A1-An and connection matrix 505 is connected to ports B1-Bm. Channel emulators $502_1$, $502_2$ are connected between connection matrix 504 and connection matrix 505. Generator module 506/channel emulator 508 pairs are connected to ports A1-An and the connection matrices. Each real cell device, e.g. macro cell 214, small cell 200, has a bi-directional connection via a port selected from A1-An to connection matrix 504. Each real user device, e.g. user device 216, has a bi-directional connection via a port selected from B1-Bm to connection matrix 505. The connection matrices sum or split the various received signals such that the real user device can attach to the real cell devices and operation can be analyzed under the channel conditions implemented by the channel emulators. The bi-directional channel emulators 502 provide channel conditions for bi-directional signals transmitted between the matrices including but not limited to signal fading, delay, power, and velocity. The channel conditions may change over time.

In the illustrated example the macro cell device 214 is connected at port A1, the small cell device 200 is connected to port A2, and the user device 216 is connected to port B1. The signal connection between the macro cell device 214 and the user device 216 via channel emulator $502_1$ and connection matrices 504, 505 is bi-directional, meaning that the transmit and receive functions of the macro cell 214 and user device 216 are serviced by this connection. Similarly, the signal connection between the small cell device 200 and the user device 216 via channel emulator $502_2$ and connection matrices 504, 505 is bi-directional, meaning that transmit and receive functions of the small cell 200 and user device 216 are serviced by this connection. Each logical connection may correspond to multiple physical connections for multi antenna devices, but only one connection is shown for clarity. Although the illustrated example includes only one real user device, the matrix may connect to any number of external ports and any number of real user devices and real cells might be included.

The real devices are used to provide information for configuring emulated device signals. This can be accomplished by generating emulated signals using information from copies of the signals from the real devices. In the illustrated example the signal transmitted from the macro cell 214 on port A1 is provided in a uni-directional fashion to the generator modules $506_1$-$506_N$. Selected generator modules demodulate and decode the signal from the macro cell. Information from the macro cell signal is used by the selected generator modules to generate an emulated small or macro cell signal. For example, generator module $506_1$ may be selected in order to generate one emulated small cell signal. The information from the real cell signal that is utilized to generate an emulated cell signal may include but is not limited to timing information, specific patterns and scheduling of ABS, and information available in the broadcast channel regarding signal transmission. The selected generator module $506_1$ uses the information to generate the specific signal for the emulated cell device. The generated signal for the emulated cell is then provided to the uni-directional channel emulator $508_1$. This channel emulator provides channel conditions including but not limited to fading, velocity, power level and delay which may change over time. The output of that channel emulator $508_1$ is provided to the connection matrices 504, 505 and summed with the other signals such that it is made available to the attached user device 216 at port B1. In some applications the generated signal may an emulated user device and that signal may be made available to the attached real cell devices via connection matrix 504. The different settings of channel emulators $502_1$, $508_1$ differentiate the signals from the real macro cell and corresponding emulated macro cell, e.g., simulating different locations and other conditions.

Another generator module $506_N$ and channel emulator $508_N$ may be selected to provide an emulated small cell from information obtained from a copy of the signal from the small cell 200 on port A2.

Multiple emulated cells can be generated from copies of a single real cell signal. Copies of the signal transmitted from the small cell device on port A2, for example, may be provided to multiple generator modules. Each of these generator modules can create a different emulated small cell from the signal. For example, the information associated with copies of the signal may be modified in different ways in order to provide differentiated emulated cells. The emulated cell signals may also be subjected to different channel conditions by the various channel emulators, e.g., simulated to be at different locations based on channel emulator settings. Consequently, the user device can be subjected to interference from the emulated cells at SINR levels and channel conditions that can be controlled and changed over time, and performance of the test described above can be accomplished with only one real small cell, one real macro cell, and one real user device. It will be understood, however, that the uni-directional connections associated with the emulated cells inhibit attachment of the user device to an emulated cell. The architecture of the multi-cell network emulator in this implementation is advantageously agnostic to the type of connected cell, e.g., any type of cell can be connected to port A1.

AWGN/CW interference 510 may also be provided to the connection matrices 504, 505. The additive white Gaussian noise (AWGN) and continuous wave (CW) signal interferences can additionally be set and added via the connection matrices to the port of connection of the user device. AWGN and/or CW interference can be used to provide additional channel conditions.

Figure 6:
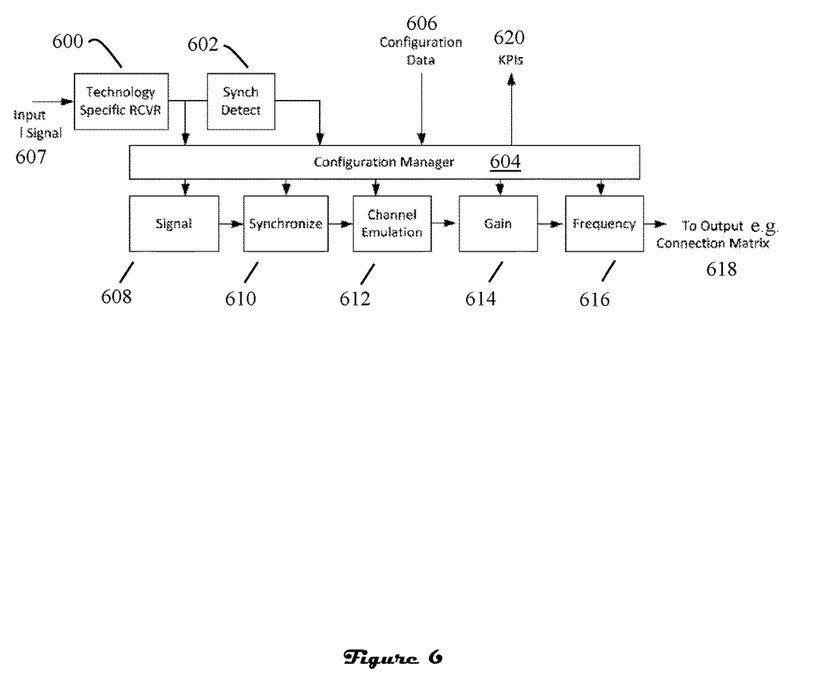
FIG. 6 is a detailed block diagram of the emulated signal path in a cell generator module/channel emulator pairing of FIG. 5.

FIG. 6 illustrates aspects of device emulation with the generator modules 506 and associated channel emulators 508 of FIG. 5 in greater detail. As described in greater detail below, a configuration manager 604 configures the various modules shown in FIG. 6 based on inputs which may include user-provided configuration data 606. Depending on which real cell is being utilized, a copy of the signal 607 from that real cell is received by a technology specific receiver 600 of the generator module 506 (FIG. 5). The receiver 600 may be functionally similar to the receiver of the real device from which it receives signals. The number of technology specific receivers implemented may match the number of ports on the multi-cell network emulator. Moreover, multiple generator modules may share a receiver if the generator modules are connected to be associated with the same real device. Some or all aspects of the signal 607 may be provided by the receiver 600 to both the configuration manager 604 and a synch detector 602. For example, the receiver 600 may extract information related to the broadcast and scheduling of the real cell, such as the normal subframe ABS pattern or the MBSFN (Multimedia Broadcast Single Frequency Network) subframe ABS pattern, and provide that information to the configuration manager 604.

The synch detector 602 may extract specific timing information from the aspects of the received signal 607 provided by the receiver 600. The extracted timing information may include the LTE PSS (Primary Synchronization Signal), SSS (Secondary Synchronization Signal) and PBCH (Physical Broadcast Control Channel), for example and without limitation. The extracted timing information may also include the SFN (System Frame Number) and the SOF (Start of Frame). The timing information extracted by the synch detector is provided to the configuration manager 604.

Again, note however that in the case of generation of an emulated user device signal the synch detector may still synch with a real cell signal, e.g., of the real cell device which will receive the emulated user device signal.

The configuration manager 604 utilizes the inputs from the technology specific receiver 600 and synch detector 602, along with any user provided configuration data 606, to set configuration parameters of a signal generator 608, synchronizer 610, channel emulator 612, gain adjust 614 and frequency adjust 616 in order to generate an emulated signal 618. KPIs (Key Performance Indicators) 620 may be output by the configuration manager for analysis.

The signal generator 608 generates a technology specific signal in response to input from the configuration manager. However the signal could be based on a statistical model, or a playback of a specific field recording, or a combination of many signals merged to one signal. The technology specific signal produced by the signal generator may include all of the fields and information of a real signal of the designated protocol. In the context of the LTE-A heterogeneous network, the signal generator produces an LTE signal that appears to be transmitted from a base station cell. The signal can be either TDD (Time Division Duplex) or FDD (Frequency Division Duplex) and may include key parameters for a listening device (e.g., a real user device) to recognize the signal as originating from a real cell device, including but not limited to PBCH (Physical Broadcast Channel), PDCCH (Physical Downlink Control Channel), PDSCH (Physical Downlink Shared Channel), PCI (Physical Cell Identity), PHICH (Physical Hybrid ARQ Indicator Channel), and CRS (Cell-specific Reference Signals). The transmission mode of the PDSCH may vary in accordance with parameters associated with the type of cell that is being emulated. The number of antenna ports may be configured to emulate any number of physical antenna ports on the emulated cell. The configuration manager may use the extracted information related to the broadcast and scheduling of the real cell, such as the normal subframe ABS pattern or the MBSFN (Multimedia Broadcast Single Frequency Network) subframe ABS pattern, to configure the signal generator 608. The technology specific signal is generated with a clocking source which is independent of the attached real cells 214, 200 (FIG. 5).

The technology specific signal produced by the signal generator 608 is provided to the synchronizer 610. The synchronizer 610 synchronizes the technology specific signal to the real cell signal. In particular, the SOF and SFN provided by the synch detector 602 are used to synchronize to the real cell signal. Note again that an emulated user device signal may synch to a real cell signal.

The synchronized signal is provided to the channel emulation module 612. The channel emulation module 612 modifies the signal in accordance with defined channel conditions which may be changed over time. The defined channel conditions correspond to configuration parameters which are set and adjusted by the configuration manager. Parameters which may be set and adjusted include but are not limited to signal fading, delay, power (other than based on the mobility path), and velocity. The channel conditions may be selected to emulate real world conditions, defined test conditions, or any other conditions under which the operator wishes to perform a simulation and test. The resulting signal outputted by the channel emulation module is provided to the gain module 614.

The specific gain module 614 adjusts the power level of the signal corresponding to the time varying power of the emulated signal to the user device 216 as a function of the defined mobility path, e.g. as shown in FIG. 2. The configuration of the gain module 614 comes from the configuration manager 604, and may be based on configuration data 606 that may be static or dynamic, and which may originate from a playback file. The resulting signal outputted by the specific gain module is provided to the frequency module 616.

The frequency module 616 produces the emulated signal by positioning the generated signal in the frequency domain of the signal path to the user device 216 relative to the real devices. In some instances it may be advantageous to position the emulated cell to be partially overlapping in the frequency domain of the signal from the real cell 214 or 200. This may be the case when emulating a CA (Carrier Aggregation) network configuration. Frequency dependent scheduling from the real cell may also be evaluated by using dynamic positioning of the emulated cell signal. It is noted that configuration from the configuration manager 604 may be static or dynamic for all blocks in FIG. 6 if not specifically mentioned.

Figure 7:
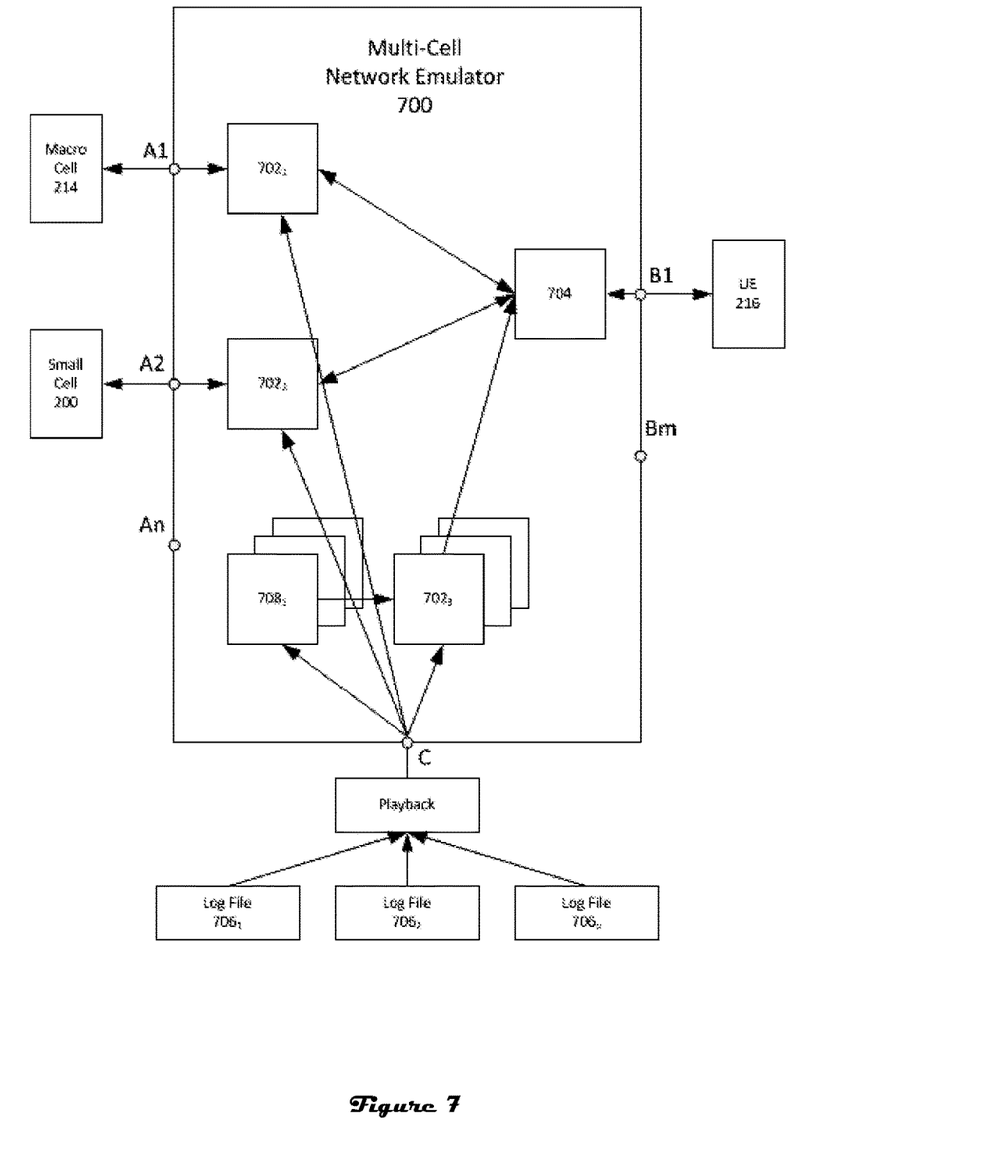
FIG. 7 is another implementation of the multi-cell network emulator of FIG. 4.

FIG. 7 illustrates another implementation of the multi-cell network emulator of FIG. 4. The illustrated multi-cell network emulator 700 includes ports A1-An, B1-Bm and C. Each A and C port is connected to a respective channel emulator, e.g., port A1 to channel emulator $702_1$, port A2 to channel emulator $702_2$, and port C to channel emulators $702_3$-$702_n$. The channel emulators are interconnected via a connection matrix 704. The C port is also connected to the Cell Generator Modules $708_1$-$708_y$. Each real cell device (macro cell 214 and small cell 200 in the illustrated example) has a bi-directional connection via a port (selected from A1-An) to a corresponding bi-directional channel emulator that provides channel conditions for the bi-directional signals. These channel conditions include but are not limited to signal fading, delay, power, velocity, and the channel conditions may change over time. The channel emulators have bi-directional connections to the connection matrix 704. Each Cell Generator Module $708_1$-$708_y$ has a unidirectional connection to a channel emulator $702_3$-$702_x$ that provides channel conditions for the unidirectional signals. These channel conditions include but are not limited to signal fading, delay, power, velocity and the channel conditions may change over time. Each real user device has a bi-directional connection via a port (selected from B1-Bm) to the connection matrix 704. The connection matrix sums and splits the various signals such that the user device can attach to the real cell devices and operation can be analyzed under the channel conditions implemented by the channel emulators. In the illustrated example the macro cell device 214 is connected at port A1, the small cell device 200 is connected to port A2, and the user device 216 is connected to port B1. The signal connection between the macro cell device 214 and the user device 216 via channel emulator $702_1$ and connection matrix 704 is bi-directional, meaning that transmit and receive functions of the macro cell 214 and user device 216 are serviced by this connection. Similarly, the signal connection between the small cell device 200 and the user device 216 via channel emulator $702_2$ and connection matrix 504 is bi-directional, meaning that transmit and receive functions of the small cell 200 and user device 216 are serviced by this connection. The signal connections between the emulated cells $708_1$-$708_y$ and the user device via channel emulators $702_3$-$702_x$ is unidirectional meaning that only the transmit signal from Cell Generators $708_1$-$708_y$ are routed to the user device 216. Each logical connection may correspond to multiple physical connections for multi antenna devices, but only one connection is shown for clarity. Although the illustrated example includes only one user device, the matrix may connect to any number of external ports and any number of user devices and real cells might be included.

Log files $706_1$-$706_p$ from any number of real cells, real user devices, and combinations thereof, are used to provide emulated signals and provide channel conditions. The log files contain recorded signals and information such as power measurements, cell information, sector information, location information, data rate, throughput, wireless channel signal quality, and handoff parameters which can be used to generate a playback file which describes emulated signals corresponding to the real devices of the log files. The channel emulators $702_1$ and $702_2$ modify the channel conditions of the real devices 214 and 200 connected to the user device 216 in order to recreate the channel conditions of the field log. The cell generators $708_1$-$708_y$ provide emulated signals corresponding to the real devices of the field log. The channel emulators $702_3$-$702_x$ modify the emulated signals in order to recreate channel conditions of the log files. The channel conditions may include but are not limited to fading, velocity, power level and delay which may change over time. The outputs of the channel emulators are provided to the connection matrix 704 and summed with the other signals such that it is made available to the attached user device 216 at port B1.

Figure 8:
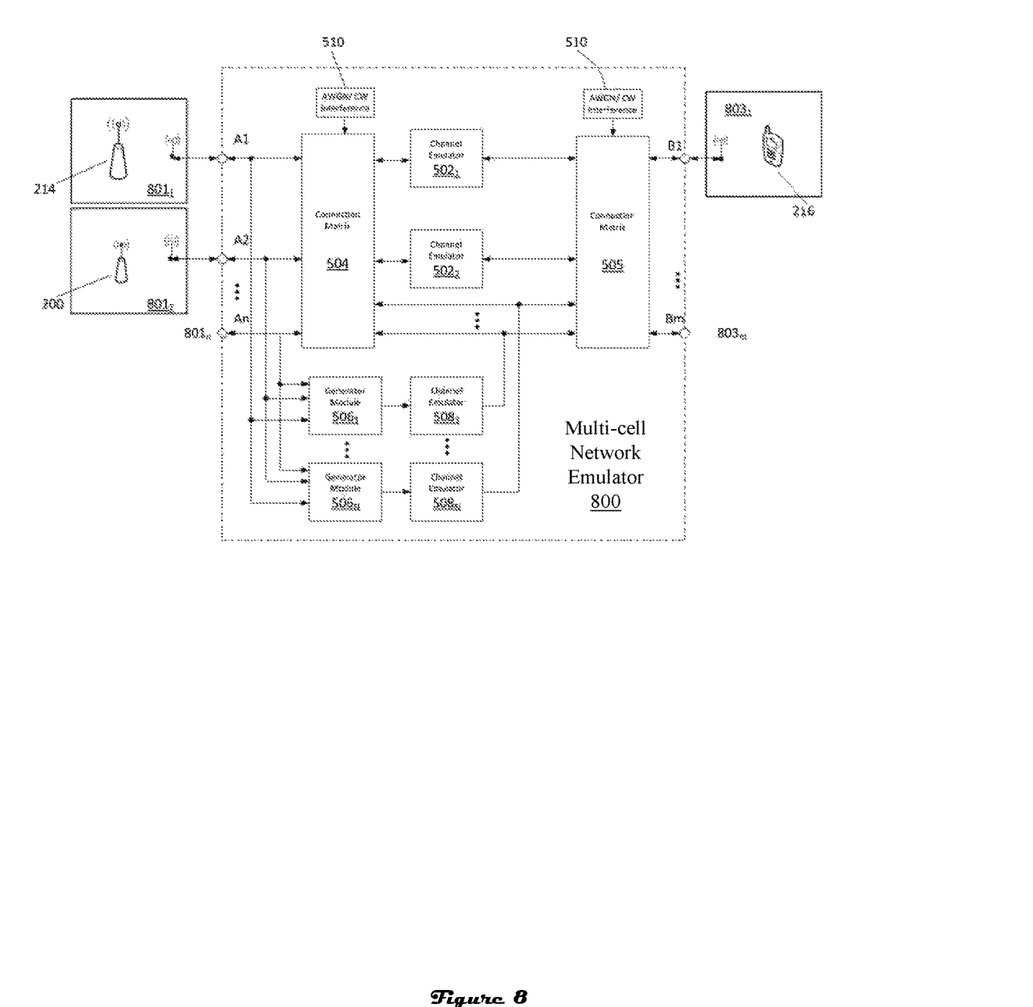
FIG. 8 is another implementation of the multi-cell network emulator of FIG. 4.

FIG. 8 illustrates another implementation of the multi-cell network emulator of FIG. 4. The illustrated multi-cell network emulator 800 includes ports A1-An and B1-Bm. Each port A1-An is connected to a OTA (over-the-air) test chamber $801_1$-$801_N$ and connection matrix 504. Each port B1-Bm is connected to a OTA (over-the-air) test chamber $803_1$-$803_m$ and connection matrix 505. Each port A1-An is also connected to a respective generator module $506_1$-$506_N$. Each generator module is connected to a respective channel emulator $508_1$-$508_N$. Channel emulators $502_1$, $502_2$ are connected to the connection matrices 504, 505. An AWGN/CW interference generator 510 is also connected to the connection matrix 505. The real devices are disposed in one or more test chambers, e.g., anechoic or reverberation chambers. OTA (over-the-air) signals are thus sent and received between the multi-cell network emulator and the real devices, e.g., macro cell 214, small cell 200, user device 216, and multi-cell network emulator 800. The emulated signals are generated by the generator modules and channel emulators as described above, albeit using copies of the real device signals received over-the-air.

In view of the descriptions of various implementations, aspects and features above it will be understood that a test system which simulates a heterogeneous network can be implemented with a mix of real and emulated cells and real user devices. Moreover, the test can simulate time varying parameters associated with a mobility path and changing channel conditions. Still further, a specific network topology including relative coordinates in three-dimensional space can be defined, e.g., based on a statistical model, a real world scenario, or a mixture of both. Although the description has described the signal generator as providing a single signal, the signal generator could also be programmed to provide a combination of many signals, such as to create a model of a cluster of devices. Although user devices may not be able to attach to emulated devices, the influence of those devices can be determined, and the use of emulated devices can enable more practical implementation of complex scenarios and tests. For example, key performance indicators indicative of operation in the presence of interference from small cells can be calculated and utilized for analysis.

A number of implementations have been described. Nevertheless, it will be understood that additional modifications may be made without departing from the scope of the inventive concepts described herein, and, accordingly, other embodiments are within the scope of the following claims.

What is claimed is:

1. An apparatus comprising:
a multi-cell network emulator comprising:
a first interface configured to communicate with a first real cell device which generates a first real cell signal;
a second interface configured to communicate with a real user device;
at least one cell emulator configured to generate a plurality of emulated cell signals; and
a connection matrix configured to provide bi-directional communication between the first interface and the second interface, and to provide communication between the second interface and the cell emulator such that the real user device receives the emulated cell signals.

2. The apparatus of claim 1 further including at least one channel emulator configured to modify signals communicated between the real cell device and the real user device in accordance with a first set of defined channel conditions.

3. The apparatus of claim 1 wherein the cell emulator utilizes the first real cell signal to generate the emulated cell signals.

4. The apparatus of claim 3 wherein the cell emulator obtains information related to broadcast and scheduling of the first real cell signal.

5. The apparatus of claim 4 wherein the obtained information related to broadcast and scheduling includes one or more of: normal subframe ABS pattern and MBSFN (Multimedia Broadcast Single Frequency Network) subframe ABS pattern.

6. The apparatus of claim 4 wherein the cell emulator obtains specific timing information from first real cell signal.

7. The apparatus of claim 6 wherein the obtained specific timing information includes one or more of: LTE PSS (Long Term Evolution Primary Synchronization Signal), SSS (Secondary Synchronization Signal), PBCH (Physical Broadcast Control Channel), SFN (System Frame Number) and the SOF (Start of Frame).

8. The apparatus of claim 6 wherein the cell emulator comprises a signal generator which generates a technology specific signal based on the obtained information related to broadcast and scheduling of the first real cell signal.

9. The apparatus of claim 8 wherein the cell emulator further comprises a synchronizer which synchronizes the technology specific signal to the first real cell signal based on the obtained timing information.

10. The apparatus of claim 9 wherein the cell emulator further comprises a channel emulation module which modifies the synchronized technology specific signal in accordance with defined channel conditions to provide a first intermediate signal.

11. The apparatus of claim 9 wherein the cell emulator further comprises a gain module which adjusts a power level in accordance with a defined mobility path of the real user device to generate a second intermediate signal.

12. The apparatus of claim 9 wherein the cell emulator further comprises a frequency module which positions one of the emulated cell signals in a defined frequency domain.

13. The apparatus of claim 1 wherein the cell emulator includes a signal generator configured to generate signals based on a statistical model, a playback of a specific field recording, or a combination of multiple signals merged to one signal.

14. The apparatus of claim 1 further including a third interface configured to communicate with a second real cell device, and wherein the connection matrix is configured to provide bi-directional communication between the third interface and the second interface.

15. The apparatus of claim 14 wherein the first real cell device is a macro cell device and the second real cell device is a small cell device or another macro device.

16. The apparatus of claim 1 wherein the cell emulator utilizes at least one playback file to generate the emulated cell signals.

17. The apparatus of claim 16 wherein the playback file is based on user-defined data, field log data, or model data.

18. The apparatus of claim 1 further including a plurality of additional interfaces configured to communicate with real devices and connect those real device to the connection matrix, the real devices selected from a group including real cell devices and user devices.

19. The apparatus of claim 1 further including at least one emulator configured to generate a plurality of emulated user device signals.

20. A method comprising:
with a multi-cell network emulator comprising a first interface configured to communicate with a first real cell device which generates a first real cell signal, a second interface configured to communicate with a real user device, at least one cell emulator, and a connection matrix:
generating a plurality of emulated cell signals;
providing bi-directional communication between the first interface and the second interface; and
providing communication between the second interface and the cell emulator such that the real user device receives the emulated cell signals.

21. The method of claim 20 further including modifying signals communicated between the real cell device and the real user device in accordance with a first set of defined channel conditions.

22. The method of claim 20 further including utilizing the first real cell signal to generate the emulated cell signals.

23. The method of claim 22 further including obtaining information related to broadcast and scheduling of the first real cell signal.

24. The method of claim 23 wherein the obtained information related to broadcast and scheduling includes one or more of: normal subframe ABS pattern and MBSFN (Multimedia Broadcast Single Frequency Network) subframe ABS pattern.

25. The method of claim 23 further including obtaining specific timing information from first real cell signal.

26. The method of claim 25 wherein the obtained specific timing information includes one or more of: LTE PSS (Long Term Evolution Primary Synchronization Signal), SSS (Secondary Synchronization Signal), PBCH (Physical Broadcast Control Channel), SFN (System Frame Number) and the SOF (Start of Frame).

27. The method of claim 25 further including generating a technology specific signal based on the obtained information related to broadcast and scheduling of the first real cell signal.

28. The method of claim 27 further including synchronizing the technology specific signal to the first real cell signal based on the obtained timing information.

29. The method of claim 28 further including modifying the synchronized technology specific signal in accordance with defined channel conditions to provide a first intermediate signal.

30. The method of claim 28 further including adjusting a power level in accordance with a defined mobility path of the real user device to generate a second intermediate signal.

31. The method of claim 28 further including positioning one of the emulated cell signals in a defined frequency domain.

32. The method of claim 20 further including generating the emulated signals based on a statistical model, a playback of a specific field recording, or a combination of multiple signals merged to one signal.

33. The method of claim 20 further including a third interface configured to communicate with a second real cell device, and providing bi-directional communication between the third interface and the second interface.

34. The method of claim 33 wherein the first real cell device is a macro cell device and the second real cell device is a small cell device or another macro device.

35. The method of claim 20 further including utilizing at least one playback file to generate the emulated cell signals.

36. The method of claim 35 further including generating the playback file based on user-defined data, field log data, or model data.

37. The method of claim 20 further including a plurality of additional interfaces configured to communicate with real devices and connect those real device to the connection matrix, the real devices selected from a group including real cell devices and user devices.

38. The method of claim 20 further including generating a plurality of emulated user device signals.

39. A non-transitory memory for use with a multi-cell network emulator device comprising a first interface configured to communicate with a first real cell device which generates a first real cell signal, a second interface configured to communicate with a real user device, at least one cell emulator, a connection matrix, and communication pathways which provide bi-directional communication between the first interface and the second interface, and communication between the second interface and the cell emulator, the non-transitory memory comprising instructions that generate a plurality of emulated cell signals such that the real user device receives the emulated cell signals.

40. The non-transitory memory of claim 39 further including instructions modify signals communicated between the real cell device and the real user device in accordance with a first set of defined channel conditions.

41. The non-transitory memory of claim 39 further including instructions that utilize the first real cell signal to generate the emulated cell signals.

42. The non-transitory memory of claim 41 further including instructions that obtain information related to broadcast and scheduling of the first real cell signal.

43. The non-transitory memory of claim 42 wherein the obtained information related to broadcast and scheduling includes one or more of: normal subframe ABS pattern and MBSFN (Multimedia Broadcast Single Frequency Network) subframe ABS pattern.

44. The non-transitory memory of claim 42 further including instructions that obtain specific timing information from first real cell signal.

45. The non-transitory memory of claim 44 wherein the obtained specific timing information includes one or more of: LTE PSS (Long Term Evolution Primary Synchronization Signal), SSS (Secondary Synchronization Signal), PBCH (Physical Broadcast Control Channel), SFN (System Frame Number) and the SOF (Start of Frame).

46. The non-transitory memory of claim 44 further including instructions that generate a technology specific signal based on the obtained information related to broadcast and scheduling of the first real cell signal.

47. The non-transitory memory of claim 46 further including instructions that synchronize the technology specific signal to the first real cell signal based on the obtained timing information.

48. The non-transitory memory of claim 47 further including instructions that modify the synchronized technology specific signal in accordance with defined channel conditions to provide a first intermediate signal.

49. The non-transitory memory of claim 47 further including instructions that adjust a power level in accordance with a defined mobility path of the real user device to generate a second intermediate signal.

50. The non-transitory memory of claim 47 further including instructions that position one of the emulated cell signals in a defined frequency domain.

51. The non-transitory memory of claim 39 further including instructions that generate the emulated signals based on a statistical model, a playback of a specific field recording, or a combination of multiple signals merged to one signal.

52. The non-transitory memory of claim 39 wherein the multi-cell network emulator device further includes a third interface configured to communicate with a second real cell device, and further including instructions that provide bi-directional communication between the third interface and the second interface.

53. The non-transitory memory of claim 52 wherein the first real cell device is a macro cell device and the second real cell device is a small cell device or another macro device.

54. The non-transitory memory of claim 39 further including instructions that utilize at least one playback file to generate the emulated cell signals.

55. The non-transitory memory of claim 54 further including instructions that generate the playback file based on user-defined data, field log data, or model data.

56. The non-transitory memory of claim 39 further including a plurality of additional interfaces configured to communicate with real devices and connect those real device to the connection matrix, the real devices selected from a group including real cell devices and user devices.

57. The non-transitory memory of claim 39 further including instructions that generate a plurality of emulated user device signals.

58. An apparatus comprising:
   a multi-cell network emulator comprising:
      a first interface configured to communicate with a first real device which generates a first real signal;
      a second interface configured to communicate with a second real device;
      at least one cell emulator configured to generate an emulated cell signal from the first real signal, and to provide the emulated signal to the second real device.

59. The apparatus of claim 58 including at least one over-the-air chamber via which the emulated signal is provided to the second real device.

60. The apparatus of claim 58 including at least one over-the-air chamber via which the first real device and the second real device communicate.

* * * * *